United States Patent [19]
Black

[11] 3,897,647
[45] Aug. 5, 1975

[54] BUCKTAIL FISHING LURE WITH DETACHABLE HOOK

[76] Inventor: Charles E. Black, Vine Creek Rd., Dogsboro, Del. 19939

[22] Filed: Dec. 17, 1973

[21] Appl. No.: 425,585

[52] U.S. Cl............. 43/42.38; 24/115 F; 43/42.28; 43/43.12; 403/328; 403/383
[51] Int. Cl............................................ A01k 85/00
[58] Field of Search............ 43/42.38, 42.28, 43.12; 24/115 F, 201 TR; 403/41, 328, 354, 383

[56] References Cited
UNITED STATES PATENTS

| | | | |
|---|---|---|---|
| 1,357,364 | 11/1920 | Van Bree | 403/328 X |
| 2,036,953 | 4/1936 | Morris | 24/115 F UX |
| 2,171,361 | 8/1939 | Gits et al. | 403/354 X |
| 2,268,541 | 1/1942 | Arbogast | 43/42.28 X |
| 3,012,358 | 12/1961 | Multanen | 43/42.28 |
| 3,091,885 | 6/1963 | Ulsh | 43/43.12 X |

*Primary Examiner*—Robert Peshock
*Assistant Examiner*—Daniel J. Leach
*Attorney, Agent, or Firm*—Sughrue, Rothwell, Mion, Zinn & Macpeak

[57] ABSTRACT

The shank portion end of a fishing hook is inserted within a longitudinal bore within the body of a bucktail lure, the shank portion is notched and the lure body is provided with a spring biased detent plug which projects into the notch to resist extraction of the hook from the body. A fin projection on the leading end of the hook shank portion is received within a slot formed within the facing end of a cylindrical end plug which fills that end of the longitudinal bore of the lure body forward of the detent plug to insure circumferential alignment of the notch on the shank portion with the detent plug.

6 Claims, 4 Drawing Figures

BUCKTAIL FISHING LURE WITH DETACHABLE HOOK

BACKGROUND OF THE INVENTION

1. Field of the Invention

This invention relates to fishing lures, and more particularly to those lures in which a hook extends rearwardly from an enlarged body and may have equal application to bucktail type lures and to surface and subsurface plugs.

2. Prior Art

Conventionally, bucktail lures as well as surface and subsurface plugs for use in conjunction with spinning rods, casting rods, and fly rods, have involved one or more hooks extending rearwardly from an enlarged body. The lure is attached to the fishing line at the forward end of the body such that the hook at the rear trails the body and the sharp end of the hook occupies a position free of and radially outwards of the body to permit contact with the mouth of the fish attempting to swallow the same. Such lures are relatively expensive, although the hook which forms one element thereof is relatively inexpensive when compared to the lure body or the bucktail and adornments which form a portion of the body. In order to prevent the lure from snagging on rocks, logs or other underwater debris, during retrieval, attempts have been made to make such lures weedless, that is, to prevent their being snagged. The most conventional means accomplishing this purpose normally comprises a leaf spring or wire which extends from the body towards the pointed end of the hook and terminates just short of the same and which may flex inwardly towards the hook shank when the lure is swallowed by the fish so as to expose the end of the hook and permit the hook to penetrate the mouth of the fish, although normally allowing the lure during retrieval to slide over the rocks, logs, weeds and the like. Depending upon the size of the lure, the lures are constructed so that the hooks are normally attached to the line or leader in terms of the expected weight of the fish being captured, taking into account the resistance or pull provided by the fish on the line, particularly at the area of attachment of the line or leader to the lure. If the lure is snagged during retrieval, particularly where the lure is at some distance under the water, continual pulling on the line causes either the leader to break or the line to break, in which case the lure is irretrievably lost.

In an attempt to overcome this problem, arrangements have been made to detachably couple a hook to the lure such that normally, the resistance and/or weight of the fish is insufficient to release the hook from the body of the lure, but upon snaring of the hook by a log or the like, the strain placed on the lure via the line is sufficient to cause the body (and most expensive portion of the lure) to separate from the hook which remains snared to the underwater object while the body is retrieved and a new hook is coupled to the lure body permitting the re-use of the lure at minimum cost to the fisherman. It is to this end that the present invention is directed.

SUMMARY OF THE INVENTION

The fishing lure which may be of the bucktail type consists primarily of an enlarged body and a detachable hook, said hook including a rod-like shank portion terminating in a hook portion at one end, said body being bored along longitudinally and slidably receiving the hooked shank portion. A notch means is provided on the shank portion and spring biased detent plug means are carried by the body with the head end or detent plug being received within a notch to resist axial removal of the shank portion from the longitudinal bore of the lure body.

Preferably, one or more radial bores are provided within the body and intersect the longitudinal bore, and the detent plug comprises a cylindrical member axially slidable within each radial bore, and a coil spring is carried within the radial bore to bias the head end of the detent plug into engagement with its notch on the hook shank portion. Preferably, the radial bores extend inwardly from the lure body outer surface, the end of the radial bore is threaded adjacent the outer surface of the body, and a threaded screw is carried within each bore and bears on the outboard end of the coil spring to allow adjustment of the spring bias for each detent plug to vary the detent force acting on the hook. Further, the longitudinal bore may be closed off at the leading end of the lure body with a cylindrical metal end plug whose end facing the hook shank portion is slotted. The leading end of the hook shank portion terminates in a projecting fin, dimensioned and configured to that of the slot and received thereby to prevent rotation of the hook shank relative to the bore to retain circumferential alignment between each detent notch and its detent plug facing the same.

DESCRIPTION OF THE PREFERRED EMBODIMENT

Figure 1:
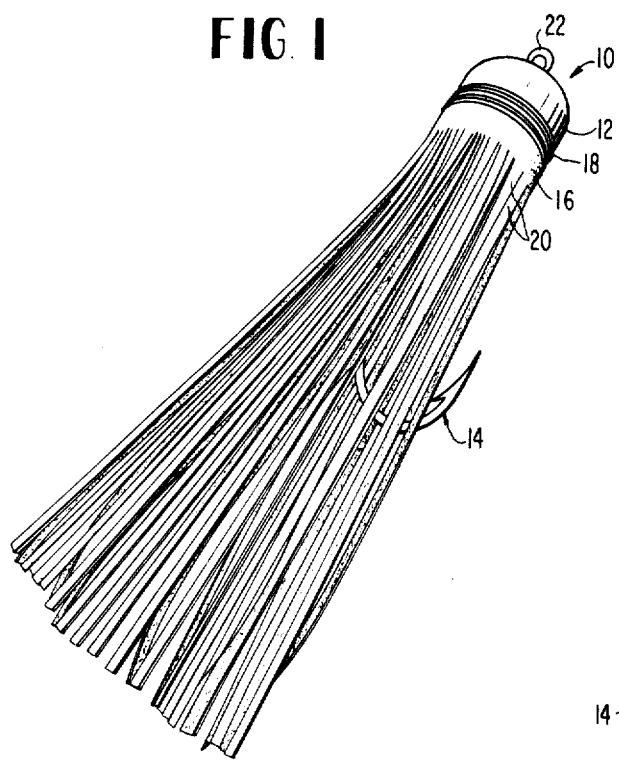
FIG. 1 is a perspective view of a bucktail type fishing lure incorporating the detachable hook arrangement of the present invention.
Figure 2:
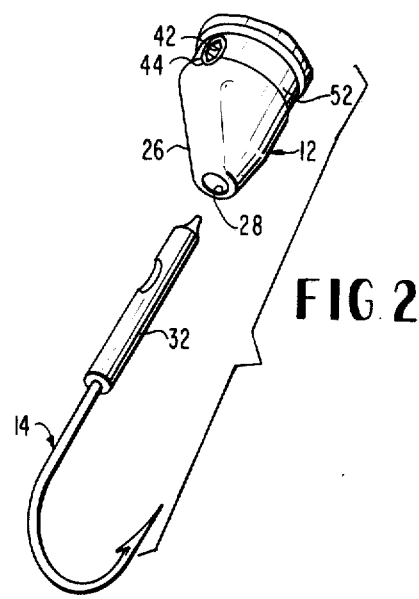
FIG. 2 is an exploded perspective view of a portion of the lure of FIG. 1 with the bucktail skirt removed and the hook detached from the body.
Figure 3:
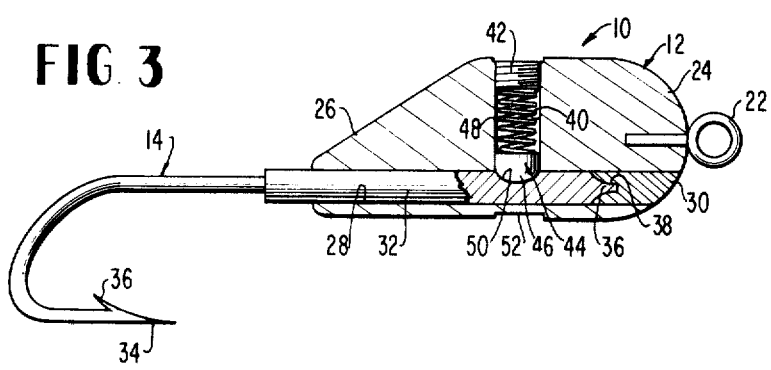
FIG. 3 is a sectional elevational view of the lure illustrated in FIGS. 1 and 2, with the hook engaging the lure body.

Reference to FIGS. 1, 2 and 3 illustrates one form of the present invention in conjunction with a bucktail type lure identified generally at 10 and consisting essentially of a lure body 12 detachably receiving a detachable hook 14, and in FIG. 1 partially obscured by the bucktail skirt 16 in the form of a tubular member closely overlying the cylindrical body 12 and held thereon by wrapping 18, the skirt 16 being slit longitudinally as at 20 in conventional fashion with the strands formed thereby extending rearwardly well beyond the outer end of hook 14. The cylindrical lure body has a metal eye 22 fixed to the leading or head of lure body 12, permitting the lure to be attached to a leader or fisher line (not shown) in conventional fashion.

The present invention is directed to the detachable nature of hook 14 from body 12 which may be best seen from further viewing FIGS. 2 and 3 in terms of one embodiment of the invention. The lure body 12 which is generally cylindrical, has a rounded head 24 and a tapered tail 26 and is further provided with a longitudinal bore 28 which extends the complete length of the lure body 12 from the tail 26 to the head 4 but is fitted at the forward end with a fixed end plug 30 of cylindrical form and which may be formed of metal or the like. In this respect, while the hook 14 is formed of metal, lure body 12 may be formed of metal or wood or plastic as desired. The hook 14 is provided with an enlarged diameter shank 32 and terminates at the rear in a forwardly directed hook portion including a pointed end 34 which includes a barb 36 in conventional fish hook fashion. Shank portion 32 is of a diameter closely approximating that of bore 28 and in this respect, the shank slides axially within bore 28.

Further, in the embodiment of FIGS. 1–3, a single radial bore 40 extends at right angles to longitudinal bore 28 and intersects the same, bore 40 extending radially inward from the side of the lure body 12. In this respect, bore 40 is threaded at least at its outer end and threadably receives cylindrical screw 42. The radial bore 40 further carries a cylindrical detent plug 44 having a curved end face 46. Positioned between the detent plug 46 and the screw 44 is a compression coil spring 48 which presses the detent plug 44 toward the hook shank portion 32. The shank 32 carries a notch 50 within its periphery, notch 50 being located axially and circumferentially so as to be in alignment with radial bore 40 and the detent plug 44 carried thereby, such that the coil spring 48 presses the detent plug 44 into engagement with notch 50 upon insertion of the shank hook 32 within bore 28, when the fin projection 36 fully seats within notch 38 of end plug 30. Further, notch 50 is concave to the same degree that the end face 46 of the detent plug 44 is convex. The screw 42 is rotated to vary the compressive force of coil spring 48 which acts on the detent plug 44 thus varying the force necessary to act axially on the hook and to effect its release from the lure body 12, should the hook snag on an underwater object during retrieval. Preferably, screw 42 is provided with a transverse slot 52 permitting a screw driver or other like implement to rotate the screw to increase or decrease the compression force of the spring 40. It should be noted that the detent plug 44 is of an axial length such that if the hook shank 32 should be removed from the bore 28, the spring 48 merely expands until the rounded head 46 of detent plug 44 contacts the opposite side of bore 28. Upon initial insertion of the hook or reinsertion of the hook, the fin projection 36 drives the detent plug 44 back into radial bore 40 compressing the spring 48 until the fin projection 36 is fully seated within the slot 38 of end plug 30, whereupon the detent plug 44 fills detent notch 50 as illustrated in FIG. 3.

Once proper compression force is set up by rotation of screw 42, the leading tubular end of the skirt 16 may be slid over the cylindrical body 12 of the lure and maintained in place by wrapping 18 which may consist of multiple turns of wrapping thread at circumferential groove 52 or a heat shrunk thermoplastic ring or similar means (not shown) may be employed.

Figure 4:
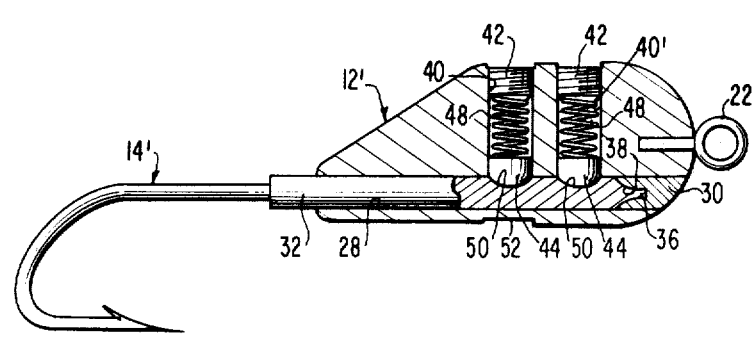
FIG. 4 is a sectional elevational view similar to that of FIG. 3 of an alternate form of the present invention.

Reference to FIG. 4 illustrates an alternate embodiment of the invention in which like elements are given like numerical designations. The only difference in the embodiment of FIG. 4 from that of FIG. 3, is the fact that instead of having one radial bore 40 which intersects the longitudinal bore 28, there is provided an additional radial bore 40' which is parallel to bore 40 and spaced slightly forward of the same. In both cases, the bores receive spring biased detent plugs 44 forced toward the longitudinal bore 28 by similar compression coil springs 48 whose compression is controlled by threaded screws 42. In this case, however, shank portion 32 is provided with a second concave notch 50' forwardly of notch 50 and in axial alignment therewith for receiving the second detent plug 44 sliding within bore 40'. Again, slot 38 within end plug 30 acts as a rotation preventive means since it receives the fin projection 36 at the leading end of shank 32, the hook 14' being inserted within bore 28 of lure body 12' in much the same manner as the prior described embodiment. The eye 22 permits engagement of the hook to the line or leader and the circumferential groove 52 on the outside of lure body 12' permits ready attachment of a bucktail type skirt such as skirt 16 of the embodiment of FIG. 1. The employment of dual detent plugs permits the detent force acting to prevent separation of the hook 14' from the lure body 12' to be doubled and thus this arrangement is preferable for the larger size lure wherein the tugging force or resistance on the hook by relatively large fish would prevent the inadvertent detachment of the hook from the lure body and thus escape from the fish, while at the same time permitting ready detachment of the hook from the lure body should the hook become snagged on an immovable object. Of course, the detent force between the detent plug and the hook shank 32 should not be so great that either the leader or line (not shown) normally attached to eye 22 would break prior to release of the hook 14' from the lure body and thus defeat the essence of the invention which is to permit retrieval of the lure body after release from the hook when the lure is snared. Again, while the hook 14' is preferably made of metal, the lure body 12' may be made of metal also or be made of plastic, wood or the like.

While the invention has been particularly shown and described with reference to a preferred embodiment thereof, it will be understood by those skilled in the art that various changes in form and details may be made therein without departing from the spirit, and scope of the invention.

What is claimed is:

1. A fishing lure comprising:
   a body,
   said body including a longitudinal bore,
   a detachable hook including a rodlike shank portion terminating in a hooked portion at one end,
   said shank portion being insertibly received within said bore,
   notch means carried by said shank,
   spring biased detent plug means carried by said body and engaged with said notch means to resist axial removal of the hook shank portion from said longitudinal bore, and
   said hook and said body including longitudinally aligned interfitting means such that upon full insertion of said hook shank portion into said body longitudinal bore, engagement between said interfitting means of said hook and said body maintain said hook portion at a predetermined position relative to said body and said notch means and said detent plug means in radial alignment.

2. The fishing lure as claimed in claim 1, wherein said body includes at least one radial bore intersecting said longitudinal bore, and said detent plug means comprises a cylindrical detent plug axially slidable within said radial bore, and a coil spring carried within said radial bore and bearing against said cylindrical detent plug to bias said detent plug into engagement with said notch means, and said notch means comprises a notch facing said detent plug.

3. The fishing lure as claimed in claim 2, wherein said at least one radial bore is threaded and a screw is threadably received within said radial bore and bears on the end of said coil spring not bearing on said cylindrical plug, whereby rotation of said screw adjusts the spring bias acting through said detent plug on said hook shank portion notch.

4. The fishing lure as claimed in claim 1, wherein said interfitting means to prevent rotation of said hook shank relative to said bore comprises a cylindrical end plug fixedly mounted within said longitudinal bore at the leading end of said lure body, the inner end of said end plug is slotted, and wherein the leading end of said shank portion terminates in a fin projection dimensioned and configured to said slot and received thereby to insure said notch means faces said detent plug means and is in alignment therewith.

5. The fishing lure as claimed in claim 2, wherein said interfitting means to prevent rotaion of said hook shank relative to said bore comprises a cylindrical end plug fixedly mounted within said longitudinal bore at the leading end of said lure body, the inner end of said end plug is slotted, and wherein the leading end of said shank portion terminates in a fin projection dimensioned and configured to said slot and received thereby to insure said notch means faces said detent plug means and is in alignment therewith.

6. The fishing lure as claimed in claim 3, wherein said interfitting means to prevent rotation of said hook shank relative to said bore comprises a cylindrical end plug fixedly mounted within said longitudinal bore at the leading end of said lure body, the inner end of said end plug is slotted, and wherein the leading end of said shank portion terminates in a fin projection dimensioned and configured to said slot and received thereby to insure said notch means faces said detent plug means and is in alignment therewith.

* * * * *

UNITED STATES PATENT AND TRADEMARK OFFICE
CERTIFICATE OF CORRECTION

PATENT NO. : 3,897,674
DATED      : August 5, 1975
INVENTOR(S) : David M. Higgins It is certified that error appears in the above-identified patent and that said Letters Patent are hereby corrected as shown below:

Column 2, line 10 "S-8" should read --8-8--.

Column 5, line 7 "collelcted" should be --collected--.

Column 6, line 1 "34" should be --84--.

Column 9, line 12 after "gathering arm assemblies" should be --38--.

Column 9, line 27 "30-30" should be --30--.

Signed and Sealed this

Seventeenth Day of August 1976

[SEAL]

Attest:

RUTH C. MASON
*Attesting Officer*

C. MARSHALL DANN
*Commissioner of Patents and Trademarks*